(12) United States Patent
Watson et al.

(10) Patent No.: US 7,222,465 B2
(45) Date of Patent: May 29, 2007

(54) BUILDING BOARD

(75) Inventors: Christine M. Watson, Heath, OH (US);
Brian J. Guhde, Westerville, OH (US);
Donn R. Vermilion, Newark, OH (US);
Thomas E. Grace, Sr., Hickory, NC
(US); Chris W. Cicenas, Columbus,
OH (US); Joshua D. Dickman, Powell,
OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 11/020,378

(22) Filed: Dec. 22, 2004

(65) Prior Publication Data

US 2006/0101768 A1    May 18, 2006

Related U.S. Application Data

(63) Continuation-in-part of application No. 10/991,278, filed on Nov. 17, 2004.

(51) Int. Cl.
*E04B 2/08* (2006.01)
*E04B 2/18* (2006.01)
*E04B 2/32* (2006.01)
*E04B 2/46* (2006.01)

(52) U.S. Cl. .............. 52/592.6; 52/560; 52/589.1; 52/590.3; 52/591.1; 52/592.1; 52/592.5

(58) Field of Classification Search ............ 52/536, 52/539, 540, 541, 543, 533, 560, 551, 589.1, 52/590.3, 591.1, 591.2, 591.3, 591.4, 592.1, 52/592.6, 592.5; 206/322, 323

See application file for complete search history.

(56) References Cited

U.S. PATENT DOCUMENTS

| 2,075,676 | A | | 3/1937 | Toney | |
|---|---|---|---|---|---|
| 2,735,143 | A | * | 2/1956 | Kearns | 52/521 |
| 2,766,861 | A | * | 10/1956 | Abramson | 52/531 |
| 2,811,118 | A | | 10/1957 | Ball | |
| 3,217,453 | A | * | 11/1965 | Medow | 52/314 |
| 3,703,795 | A | * | 11/1972 | Mattes | 52/521 |
| 3,783,570 | A | | 1/1974 | Storch | |
| 4,015,392 | A | | 4/1977 | Eaton | |
| 4,304,080 | A | * | 12/1981 | Freeman | 52/309.9 |
| 4,432,183 | A | * | 2/1984 | Pike et al. | 52/533 |

(Continued)

FOREIGN PATENT DOCUMENTS

| EP | 1 148 087 | 10/2001 |
|---|---|---|
| FR | 1530229 | 6/1968 |
| JP | 5-222806 | 8/1993 |
| JP | 6-49953 | 2/1994 |

*Primary Examiner*—Naoko Slack
*Assistant Examiner*—Chi Q. Nguyen
(74) *Attorney, Agent, or Firm*—Inger H. Eckert; Margaret S. Millikin

(57) ABSTRACT

A board suitable for installation on the side of a building has a front surface suitable for exposure to the weather, a rear surface, an upper end and a lower end, wherein the board has a stacking foot at either the upper end or lower end of the board, and has a stacking notch at the other of the upper end or lower end, with the stacking notch and the stacking foot enabling two of the boards to be stacked together with the stacking foot of each of the boards nested in the stacking notch of the other board, thereby providing stability for the stacked boards.

11 Claims, 3 Drawing Sheets

U.S. PATENT DOCUMENTS

| | | |
|---|---|---|
| 4,514,163 A | 4/1985 | Nakamura |
| 4,514,947 A * | 5/1985 | Grail .......................... 525/36 |
| 4,574,536 A * | 3/1986 | Bamber et al. ............ 52/125.3 |
| 4,603,529 A * | 8/1986 | Cronenwett et al. .......... 52/536 |
| 4,616,989 A | 10/1986 | Mewes et al. |
| 4,680,911 A | 7/1987 | Davis et al. |
| 4,788,808 A | 12/1988 | Slocum |
| 4,914,885 A * | 4/1990 | Baker et al. ................... 52/520 |
| 4,955,169 A | 9/1990 | Shisko |
| 5,040,348 A | 8/1991 | King et al. |
| 5,214,895 A * | 6/1993 | Fifield ........................ 52/533 |
| 5,224,318 A | 7/1993 | Kemerer |
| 5,424,020 A | 6/1995 | Hara et al. |
| 5,441,801 A | 8/1995 | Deaner et al. |
| 5,497,594 A | 3/1996 | Giuseppe et al. |
| 5,518,677 A | 5/1996 | Deaner et al. |
| 5,539,027 A | 7/1996 | Deaner et al. |
| 5,585,155 A | 12/1996 | Heikkila et al. |
| 5,694,728 A | 12/1997 | Heath, Jr. et al. |
| 5,695,874 A | 12/1997 | Deaner et al. |
| 5,830,395 A | 11/1998 | Vercesi et al. |
| 5,882,564 A | 3/1999 | Puppin |
| 6,007,656 A | 12/1999 | Heikkila et al. |
| 6,044,609 A * | 4/2000 | Kim ........................... 52/551 |
| 6,106,944 A | 8/2000 | Heikkila et al. |
| 6,122,877 A * | 9/2000 | Hendrickson et al. ........ 52/520 |
| 6,210,792 B1 | 4/2001 | Seethamraju et al. |
| 6,272,807 B1 | 8/2001 | Waldrop |
| 6,342,172 B1 | 1/2002 | Finley |
| 6,357,197 B1 | 3/2002 | Serino et al. |
| 6,931,803 B1 * | 8/2005 | Davis et al. .................. 52/251 |
| 2003/0046891 A1 | 3/2003 | Colada et al. |
| 2003/0056458 A1 | 3/2003 | Black et al. |

* cited by examiner

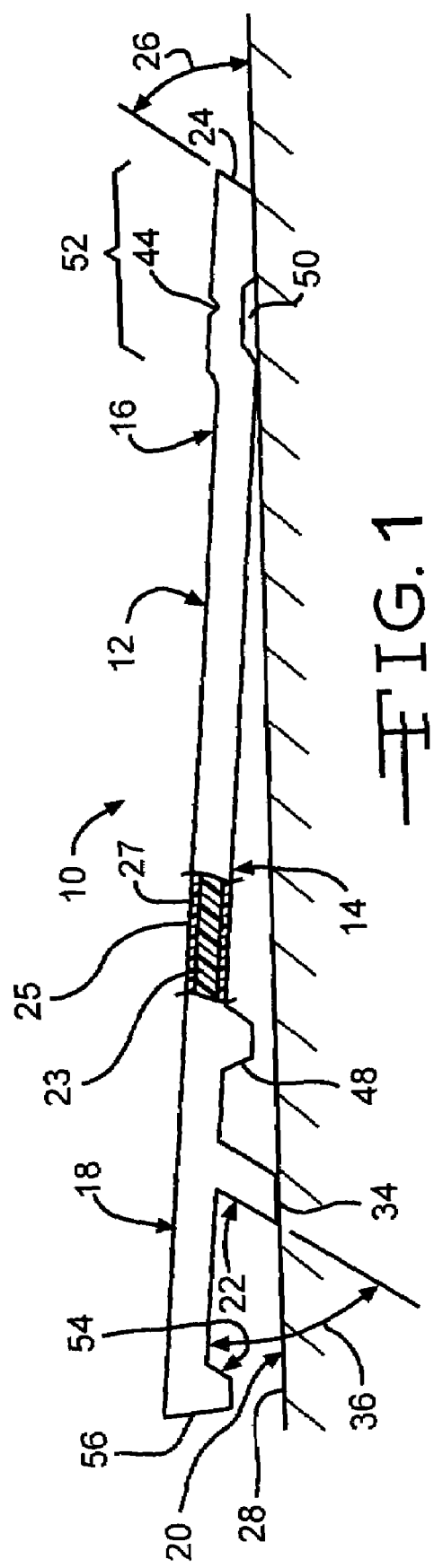
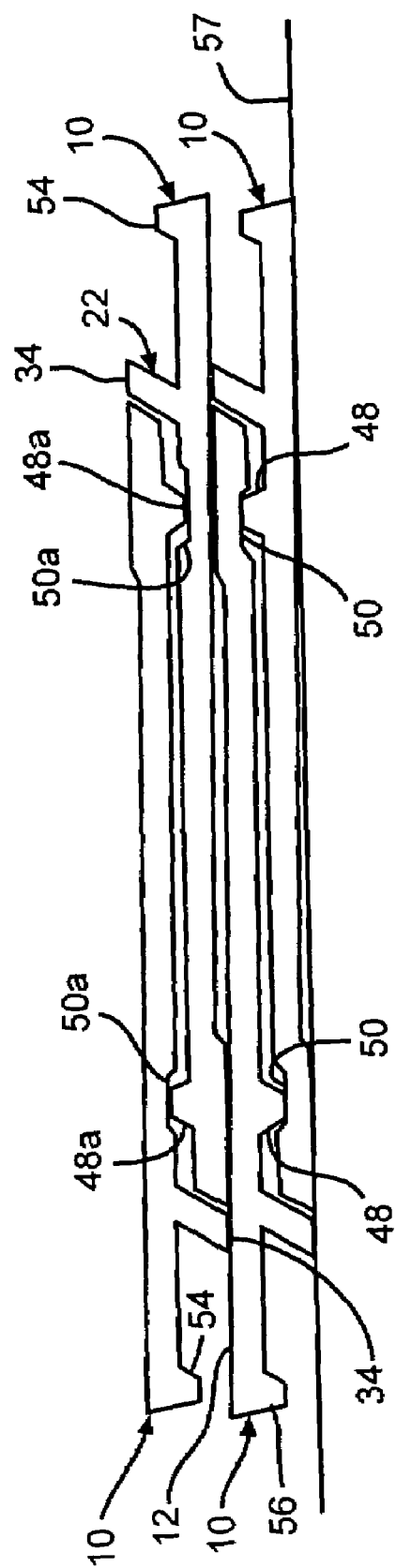

BUILDING BOARD

RELATED APPLICATIONS

This application is a Continuation-In-Part application of U.S. patent application Ser. No. 10/991,278, filed Nov. 17, 2004, and entitled WET USE CHOPPED STRAND GLASS AS REINFORCEMENT IN EXTRUDED PRODUCTS, all of which is incorporated in the present application in its entirety.

TECHNICAL FIELD

This invention relates to a board of the type installed on buildings for enclosing building framing members and for providing an aesthetically pleasing appearance.

BACKGROUND OF THE INVENTION

In the construction of buildings numerous materials are used as constituents for the building walls. Buildings, such as residential buildings, typically are constructed with framing members, such as wood or steel studs, oriented vertically and arranged in a spaced apart manner to form the building wall and insulation cavities for insulation material. On the interior side of the studs, drywall commonly is used to form the interior walls of the building. On the exterior side of the studs, an exterior wall is applied. The exterior wall can consist of a wood wallboard or panel material such as plywood or oriented strand board (OSB). Another material used is a sheathing board, such as wood fiber sheathing or rigid foam sheathing. When wood panels or sheathing materials are used, an outside weatherproof exterior layer is required. This can be a layer of brick or inches. In contrast, traditional wall boards or sheathing materials have a thickness of approximately one inch. The installation of vinyl or aluminum siding therefore usually includes some kind of wallboard or sheathing as the underlying structure for the wall. In other types of construction, siding boards of virgin wood or molded boards of cementitious material are nailed to the studs. Such boards usually have a rectangular cross-sectional shape, and are typically applied in an overlapping manner so that the lower or butt end of each board covers the upper end of the immediately previously installed board. One advantage of these overlapping boards is that the overhang provided by the bottom edge of each board is perceived in the market as being aesthetically pleasing.

It would be advantageous if there could be developed an improved board suitable for installation on the side of a building. Preferably, such a board would be structured so that it could be directly nailed or otherwise attached to the framing members of the building.

SUMMARY OF THE INVENTION

The above objects as well as other objects not specifically enumerated are achieved by a board suitable for installation on the side of a building, the board having a front surface suitable for exposure to the weather, a rear surface, an upper end and a lower end, wherein the board has a stacking foot at either the upper end or lower end of the board, and has a stacking notch at the other of the upper end or lower end, with the stacking notch and the stacking foot enabling two of the boards to be stacked together with the stacking foot of each of the boards nested in the stacking notch of the other board, thereby providing stability for the stacked boards.

According to this invention there is also provided a board suitable for installation on the side of a building, the board having a front surface suitable for exposure to the weather, a rear surface, an upper end and a lower end, the board having sufficient rigidity to be fastened by nailing to the framing members of the building and having sufficient strength so that it can be can be picked up at the approximate middle of the board and supported in a horizontal orientation without breaking, and the board being of a polymeric or cementitious material.

According to this invention there is also provided a method of making a board suitable for installation on the wall of a building, the method comprising extruding a board from a polymeric or cementitious material. The board has a front surface suitable for exposure to the weather and a rear surface. The board has a cross-sectional profile that includes a stacking foot at one end of the cross-sectional profile and a stacking notch at the other end of the cross-sectional profile, with the stacking notch and the stacking foot enabling two of the boards to be stacked together with the stacking foot of each of the boards nested in the stacking notch of the other board, thereby providing stability for the stacked boards.

According to this invention there is also provided a method of installing boards on a wall of a building, the method including providing boards having a front surface suitable for exposure to the weather, a rear surface, an upper end and a lower end, the upper and lower ends of the boards being configured so that when a plurality of the boards is installed on the wall, the lower end of a board being installed will preferably form an interlock fit with the upper end of the immediately previously installed board, thereby holding the lower end of the board adjacent the upper end of the immediately previously installed board. The boards have an average thickness of preferably at least about 0.25 inches between the front surface and the rear surface. A first board is installed on the wall, and it is secured to the wall. A second board is placed against the wall, above and resting on the first board. The second board is released so that the second board is fully supported by the first board and held by the interlock fit, and does not require support from an installer. Then the second board is secured to the wall.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic, partially broken away, view in elevation of a board suitable for installation on the side of a building.

FIG. 2 is a schematic view in elevation of a plurality of boards of FIG. 1.

DETAILED DESCRIPTION OF THE INVENTION

Figure 3:
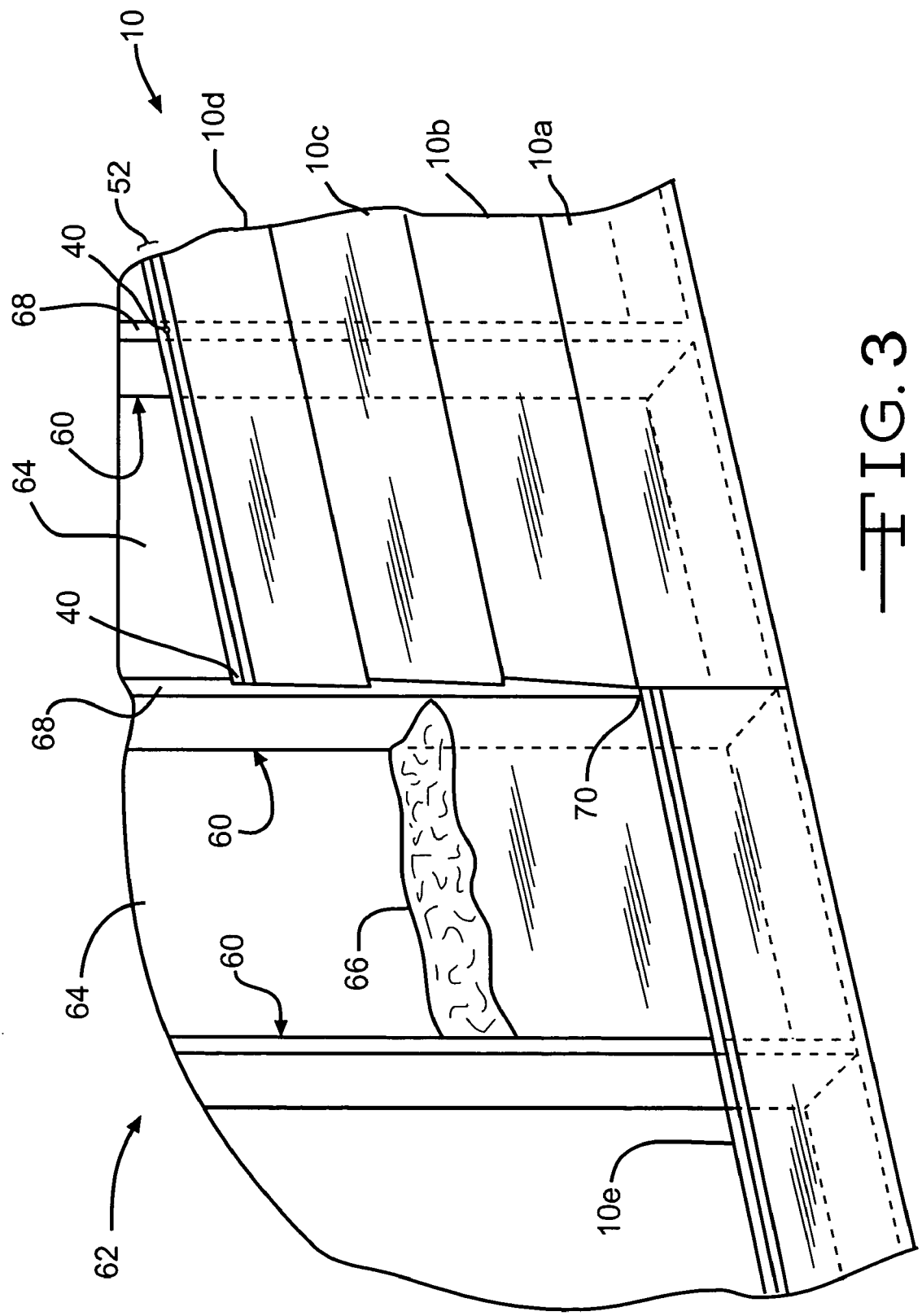
FIG. 3 is a schematic perspective view of a building showing partial installation of the boards of FIG. 1.

As shown in FIG. 1, the board of the invention is indicated at 10. The board 10 includes a front surface 12 that is suitable for exposure to the weather. The board 10 also includes a rear surface 14, an upper end 16 and a lower end 18. At the lower end 18, the board includes an interlock leg 22. Preferably, the board is comprised of a core 23 including the rear surface 14, as well as a cladding layer 25 on the front surface 12.

Figure 4:
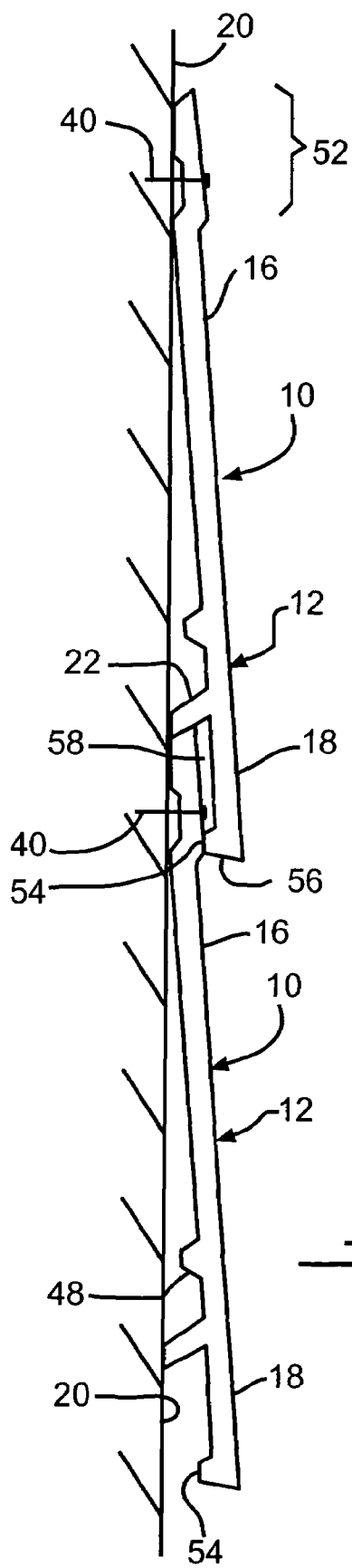
FIG. 4 is a schematic view in elevation of two boards of FIG. 1 successively installed on vertical stud.

The upper and lower ends 16, 18 of the board 10 are configured so that when a plurality of the boards is installed on the wall 20 of a building, as shown in FIG. 4, the lower end 18 of the board 10 being installed will form an interlock fit with the upper end 16 of the lower, immediately previously installed board, thereby holding the lower end 18 of the upper board 10 against the upper end 16 of the immediately previously installed lower board 10. The interlock fit is made possible by the shape of the upper and lower ends 16, 18 of the board 10. At the upper end 16, the board 10 has a top edge 24 that is oriented at an acute angle 26 to the surface 28 of the wall 20 when the board is placed along the wall surface 28. At the lower end 18 of the board, the interlock leg 22 has a foot surface 34 that rests against the surface 28 of the wall 20. The interlock leg 22 is oriented at an angle 36 that is approximately the same as the angle 26 of the top edge 24. When two boards 10 are installed in succession on the wall 20 of a building, the angled top edge 24 of the first-installed, lower broad will hold the interlock leg 22, and hence the lower end 18 of the second-installed upper board 10, in place against the wall 20. Therefore, the lower end 18 of the upper board is held in place by the immediately previously installed board. It can be seen that the interlock leg 22 of the board 10 is shaped to form a complementary fit with the top edge 24 of the immediately previously installed board 10 when a plurality of the boards 10 is installed on the wall 20 of a building. Preferably, the interlock leg 22 and top edge 24 are configured so that when a first board 10 is secured to the wall 20 of a building, the leg 22 of a second board 10 being installed thereafter will rest upon the top edge 24 of the first board 10 in a manner in which the second board 10 is fully supported by the first board 10, thereby enabling an installer to secure the second board 10 to the wall 20 without having to support the second board 20. In practice, when a second upper board is placed by the installer on top of a first-installed lower board, the installer can remove his or her hands from the second board without having the second board fall off the wall. This allows the installer to have his or her hands free for the step of actually fastening the second board to the wall. Hands-free installation enables the boards to be installed by a single installer rather than requiring one installer to hold the board while another installer fastens the board to the wall. Furthermore, as the board is secured to the wall, the wedge effect of the leg 22 being held vertically against the top edge 24 restrains the boards from gapping away from the wall, and therefore creates a consistent lime when the siding is viewed from the bottom. Additionally, because the interlock leg 22 rests against the front surface 12, and because the butt leg 54 if formed relative to the interlock leg 22, a consistent gap between the butt leg 54 and front surface is maintained by the interlock gel 22.

It can be seen in FIG. 4 that there is a positive contact or registration of the upper board 10 with the lower board 10 during installation of a plurality of boards. This provides an additional benefit of the present design because once the lowest or first course board has been installed on the framing members or sheathing panels on a horizontal or true level basis, the subsequently installed boards 10 will be self-leveling, and will not require leveling, but can be assumed to be level based on the positive contact or registration of the succession of boards, one upon the next. The positive interlock also provides the means to increase wind resistance and prevent unsightly gaps between levels or courses of boards, due to irregularities in the framed wall, without having to face nail the boards at the lower ends of the boards. It should be understood that other interlocking configurations can also be used to provide the interlock function. Also, the angle 26 of the top edge 24 need not approximate the angle 36 of the interlock leg 22 although approximately equal angles are preferred for maximum wind resistance. The important feature of the interlock fit is that the top edge 24 lock in or hold in the lower end 18 of the board 10 to the wall 20. Although shown as an angled edge, one skilled in the art appreciates that the interlock may be accomplished using other geometries not shown, including for example a pair of vertical flanges that nest in a similar manner and which hold the upper board against a lower board in the vertical and in/out planes. Likewise, an interlock could alternatively comprise a corresponding horizontal flange on each board, such that a flange extending outward (relative to the wall) from the lower board supports the flange extending inward from the rear surface of the upper board, and preferably each has a lip to keep the boards from moving relatively in/out. In yet another embodiment, one or both of the boards includes a pair of horizontal flanges and the other board has a single flange, end the flanges mate in an interlocking (e.g. in a friction fit or snap fit) relationship to hold the panels vertically and in/out. Furthermore, while shown integrally formed in the boards, these features may be added in secondary operations, such as sonically welding an interlock leg 22 or flange to the surface of a relatively flat board having a mating upper surface.

As shown in FIG. 4, the upper end 16 of the board 10 is fastened to the wall 20 by a nail 40. Any suitable fastener can be used, many of which are known in the art. While the lower end 18 of each board is held in place by the interlock fit between the angled top edge 24 and the interlock leg 22, it is to be understood that a nail or other fastener, not shown, can be used to secure the lower end 18 to the wall 20, in a face nailing arrangement if needed for additional wind resistance. Preferably, however, a blind nailing arrangement is used, with nails 40 being used only in the top end 16 of the board, and with the nails 40 being covered up by the lower end 18 of the next succeeding board 10. Optionally, the front surface 12 of the board 10 includes a horizontal nailing groove 44 to guide the installer of the boards in applying the nails 40. The nailing groove 44 also assures that the nails 40 are placed at a predetermined vertical position on the upper board and at a predetermined vertical position on the immediately previously installed lower board. Alternatively, the nailing groove 44 comprises a plurality of holes or slots drilled or punched in the upper end 16 of the board, or may comprise a line provided on the board. A slot allows for loose nailing, and therefore permits lateral movement of the board during expansion and contraction, as well as accommodates some waviness in the wall itself.

The rear surface 14 of the board 10 includes a stacking foot 48 at the lower end 18 of the board, and has a stacking notch 50 at the upper end 16, with the stacking notch 50 and the stacking foot 48 enabling two of the boards 10 to be stacked together, where the stacking foot 48 of each of the boards is nested in the stacking notch 50 of the other board, thereby providing stability for the stacked boards. The stacking notch 50 can have any suitable concave shape that will form a complementary fit with the stacking foot 48.

Preferably, the stacking notch 50 is created beneath a raised nailing area 52 on the front surface 12 of the board, and partially defined by the butt leg 54 and butt edge 56 of the board. This raised nailing area 52 includes the nailing groove 44. The stacking notch 50 is positioned on the rear surface of the board, within the nailing area 52. As can be seen in FIG. 2, when two of the boards 10 are stacked together with their rear surfaces 14 facing each other, the two boards 10 can be stacked with a substantially planar profile. The boards 10 are substantially parallel to a surface 57 on which the boards are resting. The interlock leg 22 of each board preferably extends to the extent that the foot surface 34 of the interlock leg reaches the level of the front surface 12 of the other of the boards of the pair of nested boards. In an alternative embodiment, as illustrated in FIG. 2, the stacking foot 48a can be at the upper end 16 of the board and the stacking notch 50a can be positioned at the lower end 18 of the board.

It can be seen in FIG. 4 that when a plurality of boards 10 is installed on a building wall, a pair of legs, i.e., the butt leg 54 and the interlock leg 22, being spaced apart from each other, form an airspace or void 58 positioned above the nail 40. The void 56 extends along the length of the boards, and assures that the board will not be required to rest on or contact the nail 40 when the board is secured to the wall. The interlock leg 22, the butt leg 54 and the rear surface 14 of the board are configured to hold the rear surface 14 of the second board in a planar position relative to the front surface 12 of the first board, such that the rear surface 14 of the second board is held with a consistent gap or spacing with respect to the front surface 12 of the first board along the length of the board.

As shown in FIG. 3, the boards 10 can be attached directly to framing members, such as studs 60, of a building wall 62. The studs form insulation cavities 64 into which insulation material 66 can be placed to increase the R-value of the building wall 62. A plastic film vapor barrier can also be applied to the studs prior to board installation to prevent moisture intrusion. The installation of the boards 10 typically will include the installation of a lowest or starter board 10a. Subsequently, additional boards 10b, 10c, and 10d are applied to the framing members, i.e., studs 60, of the wall 62 using a blind nailing technique. The last-installed board 10d in FIG. 3 shows the nails 40 fixing the board 10d in place on the front face 68 of the studs 60. An additional course of boards, beginning with lowest or starter board 10e is also shown. Optionally, the boards 10 can be provided with tongue-and-groove vertical edge surfaces, not shown, to provide a good vertical joint between adjacent courses, such as at the joint 70 between boards 10a and 10e. Although FIG. 3 shows the boards 10 being installed directly to the studs 60, it is to be understood that optionally there can be a wood panel layer, foam, or a sheathing layer, not shown, installed first on the studs 60, with the boards 10 applied on top of the panel or sheathing layer.

The boards 10 can be made of any suitable material. Preferred material for the boards is a polymeric material or a cementitious material. Optionally, the boards can be foamed. Preferably, the boards are comprised of the core layer 23 and the cladding layer 25, as schematically illustrated in FIG. 1. The core layer 23 preferably contains a skin layer 27 of dense polymer compound, which is about 10 percent of the total core thickness, and a center layer of foamed polymer. Preferably, the skin layer 27 has a density sufficiently high to reduce the void content of the skin layer 27 to less than 10 percent by volume, and preferably less than 5 percent. Optionally, the boards can be made by a Celuka process, which is a process known in the art. This construction provides a high strength-to-weight ratio when compared to materials with a constant density gradient. The core layer is primarily for structural purposes, and is preferably made of extruded polyvinyl chloride. Other materials that can be used for the core include thermoplastic foams such as polyethylene, polypropylene, polystyrene, polyurethane, and thermoset foams such as polyurethane, polyester or phenolic. Optionally, the core layer can be reinforced with any suitable reinforcement material such as glass fibers, synthetic fibers such as polymer fibers, or natural fibers such as cellulose, kenaf, hemp, flax, jute and wood fibers. The reinforcement material can optionally be treated with a suitable binder. The cladding layer is primarily for weathering and decorative purposes, and can also provide color to the boards. Preferably the cladding layer is made of any one or more material of the group including polymethylmethacrylate, polyvinyl chloride, styrene butadiene acrylonitrile terpolymer (ABS), polyvinylidene fluoride and polyvinylfluoride. The cladding layer can also be comprised of films or coatings of polyvinylidene fluoride or polyvinylfluoride. The cladding layer can also be reinforced. Optionally, the board is embossed for decorative effect. A preferred formulation and process to manufacture same is provided in copending commonly assigned US patent application entitle WET CHOPPED STRAND GLASS AS REINFORCEMENT IN EXTRUDED PRODUCTS, filed Nov. 17, 2004, naming O'BRIEN-BERNINN et al. as inventors, U.S. Ser. No. 10/991,278, which is incorporated herein by reference in its entirety.

In a preferred construction method, the core layer and cladding layer are coextruded. Any suitable thicknesses can be used for the core and cladding layers, but a preferred thickness of the cladding layer is on the order of about 7 mils (about 0.18 mm) for a polyvinyl chloride cap and about 4 mils (about 0.10 mm) for an acrylic cap. Ideally, the cladding layer has a thickness sufficient to be essentially opaque to UV radiation for protection of the core layer. The thickness of the entire board profile will typically be within the range of from about 0.25 to about 1.25 inches, although the board can be made in different thicknesses. The core thickness is typically within the range of from about 0.125 to about 0.50 inches, although other thicknesses can be used. Preferably, the entire board profile board 10 has an average thickness of at least about 0.25 inches between the front surface and the rear surface. In one embodiment of the invention the average thickness is at least about 0.375 inches. In another embodiment the average thickness is greater than about 0.875 inches. The average thickness is determined by ignoring such protrusions as the interlock leg 22, stacking foot 48, raised nailing area 52, butt leg 54 and butt edge 56. The typical height dimension for the boards from the top edge 24 to the butt edge 56 is within the range of from about 5 inches to about 12 inches, although other dimensions can be used. The extrusion of the boards need not be confined to extruding a single board, and a number of boards, such as four boards forming a panel, not shown, can be extruded as a single unit. Preferably, when the boards are extruded, the board will have a cross-sectional profile that includes a stacking foot at one end of the cross-sectional profile and a stacking notch at the other end of the cross-sectional profile, with the stacking notch and the stacking foot enabling two of the boards to be stacked together with the stacking foot of each of the boards nested in the stacking notch of the other board, thereby providing stability for the stacked boards.

One of the advantages of the boards 10 over conventional construction materials, such as hardboard siding or hardwood siding, or boards made of fiber-cement materials, is that a preferred embodiment of the boards 10 of the present invention are much more light weight than those conventional materials, primarily because the boards 10 of the invention are preferably partially or entirely made of a foamed material. Further, the board 10 has sufficient structural integrity that it can be picked up at the approximate middle of the board and supported flat, i.e., in a horizontal orientation rather than in a vertical orientation, without breaking. This is partially due to the rib-like structure of the interlock leg 22, the stacking foot 48, raised nailing area 52, butt leg 54 and butt edge 56. In contrast, conventional siding of cementitious material would break under such handling. This increased structural strength of the board of the invention will enable manipulation of the boards 10 by a single installer, thereby increasing the application efficiency during the installation process. Further, conventional relatively thick boards of cementitious material or wood, such as, for example, hardboard siding or hardwood siding, are not easily amenable to different cross-sectional shapes that allow flexibility in design. It should be understood that the boards 10 of the invention can be made of cementitious material, such as fiber-reinforced cement. Also, the boards 10 of the invention can be made of wood, water-resistant gypsum, or any other known material.

Figure 5:
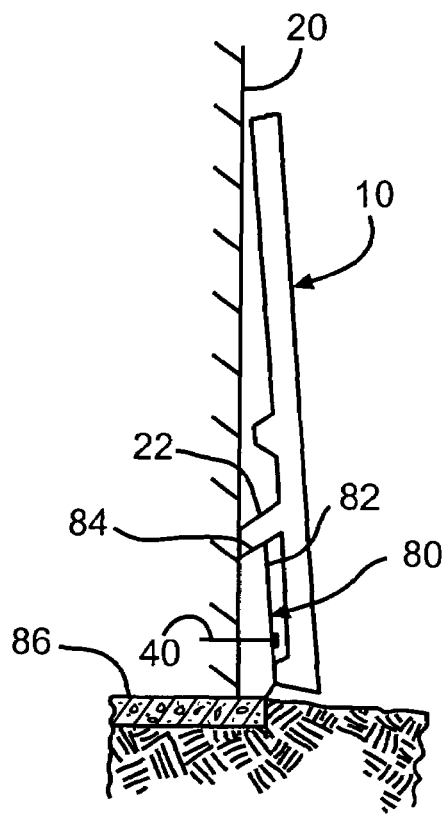
FIG. 5 is a schematic view in elevation of a building showing a board of the invention in combination with a starter strip.

As shown in FIG. 5, a plurality of the boards 10 can be installed on a building wall 20 in combination with a starter strip 80. The starter strip 80 preferably has an upper end 82 that is similar to (including identical to) the upper end 16 of the boards 10, and has an angled top edge 84 similar to the top edge 24 of the boards 10. One skilled in the art appreciates a board may be cut such that the top end may be ripped from a board, and the lower end may then be used as the top course of siding. Furthermore, one could provide a notch on the backside of a board 10 to enable one to snap the top end of a board for a starter strip. The starter strip 80 can be installed on the wall 20 in any suitable manner, such as with nails 40. The board preferably rests on a foundation 86. Once the starter strip 80 is installed, subsequent boards 10 can be installed in higher courses. The interlock fit between the starter strip 80 and the next installed board 10 will hold the next installed board 10 against the wall 20, and will also support the next installed board 10 so that the installer can secure the next installed board 10 to the wall 20 in a hands-free manner. The starter strip 80 can be made of the same material and construction as the boards 10. However, since the starter strip 80 is not exposed to the weather and does not show visibly after installation of the next board 10, the starter strip 80 can be made of any suitable material, such as wood, cementitious material, composite material, and steel.

Furthermore, while not illustrated in the Figures, one skilled in the art appreciates that the longitudinal ends of each board may include an overlap feature to permit overlap of adjacent boards to minimize the visible gap between adjacent boards within a course of siding. Such overlap feature may include e.g. a shiplap-type joint, a beveled joint, a male-female groove relationship, or any such method of overlap.

The principle and mode of operation of this invention have been described in its preferred embodiments. However, it should be noted that this invention may be practiced otherwise than as specifically illustrated and described without departing from its scope.

What is claimed is:

1. A board suitable for installation on the side of a building, the board having a front surface suitable for exposure to the weather, a rear surface, an upper end and a lower end, wherein the board has a stacking foot at either the upper end or lower end of the board, and has a stacking notch at the other of the upper end or lower end, with the stacking notch and the stacking foot enabling two of the boards to be stacked together with the stacking foot of each of the boards nested in the stacking notch of the other board, thereby providing stability for the stacked boards, in which the board has a nailing area at the upper end of the board, and the stacking notch is positioned on the rear surface of the board, within to nailing area.

2. A board suitable for installation on the side of a building, the board having a front surface suitable for exposure to the weather, a rear surface, an upper end and a lower end, wherein the board has a stacking foot at either the upper end or lower end of the board, and has a stacking notch at the other of the upper end or lower end, wherein the stacking notch and the stacking foot extend from the rear surface of the board, with the stacking notch and the stacking foot enabling two of the boards to be stacked together with the stacking foot of each of the boards nested in the stacking notch of the other board, thereby providing stability for the stacked boards; wherein the board has a nailing area having a horizontal groove on the front surface of the board as a guide for fastening the board to a building selected from the group consisting of a horizontal groove or line on the front surface of the board, a plurality of holes, and a plurality of nailing slots.

3. A board suitable for installation on the side of a building, the board having a front surface suitable for exposure to the weather, a rear surface, an upper end and a lower end, wherein the board has a stacking foot at either the upper end or lower end of the board, and has a stacking notch at the other of the upper end or lower end, with the stacking notch and the stacking foot enabling two of the boards to be stacked together with the stacking foot of each of the boards nested in the stacking notch of the other board, thereby providing stability for the stacked boards, including a nailing area, where the nailing area is a raised portion of the front surface of the board.

4. The board of claim 3 wherein the nailing area has a horizontal groove on the front surface of the board as a guide for fastening the board to a building.

5. The board of claim 3 in which the lower end of the board includes a butt leg structured to maintain the lower end of the board spaced apart from the front surface of the immediately previously installed board when a plurality of the boards is installed on the wall of a building.

6. The board of claim 5 in which the butt leg rests on the raised portion of the front surface of the immediately previously installed board.

7. A board suitable for installation on the side of a building, the board having a front surface suitable for exposure to the weather, a rear surface, an upper end and a lower end, wherein the board has a stacking foot at either the upper end or lower end of the board, and has a stacking notch at the other of the upper end or lower end, wherein the stacking notch and the stacking foot extend from the rear surface of the board, with the stacking notch and the stacking foot enabling two of the boards to be stacked together with the stacking foot of each of the boards nested in the stacking notch of the other board, thereby providing stability for the stacked boards, in which a core layer contains a skin layer of dense polymer compound.

8. The board of claim 7 in which the core layer is comprised of one or more thermoplastic or thermoset materials of the group polyethylene, polypropylene, polystyrene, polyurethane, polyester and phenolic, and the cladding layer is comprised of one or more materials of the group polymethylmethacrylate, polyvinyl chloride, a styrene butadiene acrylonitrile terpolymer, polyvinylidene fluoride and polyvinylfluoride.

9. The board of claim 8 in which the core layer is comprised of polyvinyl chloride, and the cladding layer is comprised of an acrylic material.

10. The board of claim 8 in which the cladding layer is comprised of a styrene butadiene acrylonitrile terpolymer.

11. The board of claim 8 in which the cladding layer further comprises reinforcement fibers.

* * * * *